Patented Mar. 26, 1946

2,397,398

UNITED STATES PATENT OFFICE 2,397,398

RESINOUS CONDENSATION PRODUCT OF FORMALDEHYDE AND AROMATIC PETROLEUM FRACTION

Darwin E. Badertscher, Woodbury, and Richard B. Bishop, Pitman, N. J., assignors to Socony-Vacuum Oil Company, Incorporated, a corporation of New York No Drawing. Application October 30, 1942, Serial No. 463,938

8 Claims. (Cl. 260—67)

This invention relates broadly to resinous materials. More particularly, it relates to a process for the production of resinous materials by the condensation of aromatic hydrocarbons and aldehydes.

As is well known to those familiar with the art, various resinous materials are formed by the condensation of aromatic hydrocarbons and carbonyl compounds, particularly aldehydes, in the presence of certain catalysts or condensing agents. The first condensing agent to be successfully used in the aforesaid condensation was sulfuric acid. The resinous materials obtained with sulfuric acid as the catalyst are, in general, of little value for they are either extremely brittle or have relatively low melting points and deep colors, the latter property probably being the result of the oxidizing action of the acid. Hydrochloric acid has also been used as the condensing agent in effecting the resinification of aromatic hydrocarbons and aldehydes; however, as hereinafter illustrated, this acid is inactive at relatively low temperatures, at about 25° C., becoming active only at relatively high temperatures, or about 180° C. Although hydrobromic acid has also been proposed as a catalyst for the condensation of aromatic hydrocarbons, such as those containing alkyl side-chains, and aldehydes, many of the resinous materials obtained therewith are undesirable for they contain small amounts of bromine in the side-chains, and as such act as lachrymators when heated. To a somewhat lesser degree, this is true of the resinous materials obtained with hydrochloric acid where small amounts of the chlorine go into the side-chains.

This invention is predicated upon the discovery that hydrogen fluoride will catalyze or promote the condensation of aromatic hydrocarbons and aldehydes. Hydrogen fluoride is active for the condensation contemplated herein at both low and relatively high temperatures, such as, for example, about 0° C. and about 200° C., respectively. The resinous materials obtained with hydrogen fluoride as the catalyst are generally relatively light in color and have relatively high melting points. These properties—light color and relatively high melting points—are very desirable in resinous materials. Thus, the resinous materials obtained as contemplated herein are superior to those of the prior art wherein other acids are used to catalyze the condensation of aromatic hydrocarbons and aldehydes.

Aromatic hydrocarbon materials such as benzene, toluene, xylenes, mesitylenes, naphthalene, alpha- and beta- methyl naphthalenes, polymethyl naphthalenes, anthracene, etc., can be used in the process contemplated herein. Preferred as inexpensive aromatic hydrocarbon materials are petroleum fractions rich in aromatic hydrocarbons. Typical, and particularly preferred, of such aromatic-petroleum fractions are those obtained by catalytic cracking or cyclization, or catalytic cracking and cyclization, of petroleum stocks and having boiling ranges from about 300° F. to about 400° F., and from about 500° F. to about 750° F.; and those obtained by thermal cracking of petroleum stocks and having boiling ranges from about 400° F. to about 600° F.

In general, all aldehydes are contemplated herein for condensation with the foregoing aromatic hydrocarbons in the presence of hydrogen fluoride. Representative aldehydes are formaldehyde, acetaldehyde, propionaldehyde, benzaldehyde, toluic aldehydes, etc. The aliphatic aldehydes are preferred and particular preference is given herein to formaldehyde which may be used either in the gaseous phase, the aqueous phase as 37% formalin, or in the solid phase such as trioxymethylene or paraformaldehyde.

The hydrogen fluoride used as the catalyst or condensing agent herein may be the anhydrous product or it may be employed in aqueous solutions of a wide range of concentrations. Anhydrous hydrogen fluoride, however, is preferred. The amount of hydrogen fluoride used may be varied from about ½ per cent to about 50 per cent of the reaction mixture, but, in general, most satisfactory results are obtained with amounts of the order of 5 to 20 per cent.

The properties of the resinous materials obtained as contemplated by this invention may be modified by varying one or more of a number of influencing factors. The materials may be of various degrees of hardness or softness, of brittleness or toughness, and may be light or dark in color, etc., depending upon the reaction conditions. Temperature, time, concentration of hydrogen fluoride, ratio of reactants, treatment following resinification (such as distillation) etc., all may be regulated to obtain resinous materials of different properties. The products obtained may be used in paints, varnishes and lacquers, in molding compositions, as shellac replacements, as electrical insulating materials, and waxes or extenders for more expensive resins such as the polystyrene resins and carnauba wax, etc.

As aforesaid, hydrogen fluoride is effective for the condensation of aromatic hydrocarbons and aldehydes over a wide range of temperatures including both low temperatures and relatively high temperatures. In this respect, hydrogen fluoride differs substantially from the related halogen acids, hydrochloric and hydrobromic acids which are effective as catalysts for their reactions at relatively high temperatures only. To demonstrate this difference in activity, comparative results of the preparation of resinous materials of the type contemplated herein are set forth in Table I below. The preparations were carried out in sealed stainless-steel reaction vessels and, in all cases, 250 grams of an aromatic-rich hydrocarbon stock obtained from a catalytic cracking operation of a petroleum stock and identified by the characteristics: boiling range 310–395° F., kauri-butanol No. 80, flash point (tag closed cup) 100° F. were used with 35 grams of trioxymethylene and about 40 grams of anhydrous hydrogen halide. Each reaction was carried out for about 6 hours at either about 25° C. or about 180° C. as indicated in Table I. With each reaction, the reaction vessel was opened at the end of about six hours and the contents taken up in benzol. The benzol solution was filtered, the filtrate neutralized with dilute (10%) sodium hydroxide solution and then washed with water, separated and filtered. The washed benzol filtrate was then distilled to a pot temperature of about 250° C. under about 10 mms. pressure, leaving the resin as the residue. The yield obtained in each case is given below in Table I.

Table I

| Catalyst used (anhydrous) | Temperature, °C. | Yield, grams |
|---|---|---|
| HF | 25 | 83.5 |
| HF | 180 | 105 |
| HCl | 25 | 2.4 |
| HCl | 188 | 65 |
| HBr | 25 | 2 |
| HBr | 180 | 59 |

The results tabulated in Table I clearly indicate that hydrogen fluoride is effective at both low temperatures (25° C.) and at relatively high temperatures (180° C.). The results also demonstrate that hydrogen fluoride is a much more effective condensing agent than either hydrochloric or hydrobromic acids at such temperatures.

To further demonstrate the superiority of hydrogen fluoride over the related halogen acids, hydrochloric and hydrobromic acids, resinous materials were prepared in the presence of the aqueous halogen acids. The preparations were carried out in sealed metal flasks maintained at 100° C. In each case, 250 grams of the hydrocarbon used above (Table I) and 35 grams of trioxymethylene were used. The products were treated as described above in discussion of the products shown in Table I. These results are given in Table II which follows and are self-explanatory:

Table II

| Catalyst used (aqueous) | Conc. | Flask | Wt., grams | Time, hrs. | Yield, grams |
|---|---|---|---|---|---|
| | Percent | | | | |
| HF | 48 | Copper | 100 | 3 | 85 |
| HCl | 38 | Steel | 100 | 3 | 2.2 |
| HBr | 48 | Copper | 100 | 6 | 24 |

The effects of various factors, such as concentration of reactants, temperature, etc., on the yield of resin obtained from an aromatic hydrocarbon (that used in connection with Tables I and II) and trioxymethylene are illustrated by the results tabulated in Table III below. All products were worked up as described above in connection with Table I.

Table III

| Variable changed | Reaction No. | Wt. of hydrocarbons, grams | Wt. of (HCHO)₃, grams | Wt. of anhydrous HF, grams | Temp., °C. | Time, hrs. | Yield, grams |
|---|---|---|---|---|---|---|---|
| Wt. of HF | 24 | 250 | 35 | 5 | 100 | 6 | 68 |
| | 29 | 250 | 35 | 15 | 100 | 6 | 84 |
| | 26 | 250 | 35 | 25 | 100 | 6 | 74 |
| | 33 | 250 | 50 | 15 | 100 | 6 | 94 |
| | 31 | 250 | 50 | 25 | 100 | 6 | 124 |
| | 32 | 250 | 50 | 35 | 100 | 6 | 140 |
| Wt. of (HCHO)₃ | 35 | 250 | 25 | 5 | 100 | 6 | 49 |
| | 24 | 250 | 35 | 5 | 100 | 6 | 68 |
| | 34 | 250 | 25 | 15 | 100 | 6 | 56 |
| | 29 | 250 | 35 | 15 | 100 | 6 | 84 |
| | 33 | 250 | 50 | 15 | 100 | 6 | 94 |
| | 22 | 250 | 30 | 25 | 100 | 3 | 81 |
| | 27 | 250 | 35 | 25 | 100 | 3 | 80.5 |
| Temperature | 20 | 250 | 35 | 25 | 0 | 6 | 42 |
| | 26 | 250 | 35 | 25 | 100 | 6 | 74 |
| Time | 27 | 250 | 35 | 25 | 100 | 3 | 80.5 |
| | 26 | 250 | 35 | 25 | 100 | 6 | 74 |
| | 28 | 250 | 35 | 25 | 100 | 16 | 85 |

Inspection of the results in Table III show the following features in connection with the factors susceptible of variation. In general, an increase in the concentration of hydrogen fluoride, other factors remaining constant, appears to increase the yield of resin and an increase in concentration of aldehyde (trioxymethylene), with other factors the same, also increases the yield of resin; the yield is also affected by temperature as shown by reactions 20 and 26 above, and by the data in Table I. As aforesaid, however, and as is shown by Table I, yields in commercial quantities of superior resins can be obtained with hydrogen fluoride at low temperatures, for example, 0° C. (reaction 20 above) which is not the case with the other hydrogen halides. The period of reaction, at least within the range of time intervals represented by reactions 26, 27 and 28, does not appear to have any material effect on the yield.

Reaction 20, of Table III, demonstrates that hydrogen fluoride is effective at temperatures in the neighborhood of 0° C. Although the highest reaction temperatures illustrated are at about 180° C., it would appear from the results shown in Tables I and III that hydrogen fluoride would be effective for the purposes contemplated herein at still higher temperatures, such as, for example, about 200° C.

It will be apparent to those familiar with the art that glass equipment cannot be used effectively for the condensation contemplated herein in view of the well-known chemical action of hydrogen fluoride on glass. Equipment made of various metals and alloys of such metals may be used in the preparation of the resinous materials described above. In general, copper, stainless steel and iron reaction vessels are considered most desirable for our purposes.

As aforesaid, the resinous materials contemplated herein may have different physical properties depending upon the various factors referred to above. The following examples of typical preparations clearly indicate several of these typical resinous materials.

*Example I*

A mixture of 250 grams of an aromatic rich hydrocarbon fraction, described above in connection with Table I, 50 grams of trioxymethylene and 35 grams of anhydrous hydrogen fluoride was shaken in a tightly-capped copper flask, in a 100° C. steam bath for 18 hours. The mixture was then cooled, neutralized with 20–25% sodium hydroxide, taken up in benzene, water washed, filtered and the filtrate distilled to a pot temperature of 250° C. under 10 mms. pressure. The residue, 140 grams, is a light-colored resin with a ball-and-ring melting point of about 89° C.

*Example II*

A mixture of 200 cc. of an aromatic-rich hydrocarbon fraction obtained from a thermally-treated recycle stock from a thermal cracking operation and having a boiling range of about 400–600° F., 40 grams of trioxymethylene and 25 grams of anhydrous hydrogen fluoride was stirred in a tightly-capped copper flask for 6 hours in an ice bath, and then stirred for 16 hours at room temperature. The reaction mixture was then worked up as in Example I. A light-colored resin, 148 grams, with a ball-and-ring melting point of about 77° C. was thus obtained.

*Example III*

A heavy fuel distillate from a catalytic cracking operation having the following properties:

Boiling range: ° F.
  Initial boiling point_____ 504
  10%_____ 520
  50%_____ 540
  90%_____ 660
  End point_____ 735
ASTM pour point_____ 0

S. U. V.@100° F., 50 seconds, was used in this preparation.

A mixture of 1000 grams of this aromatic-rich hydrocarbon fraction, 200 grams of trioxymethylene and 105 grams of hydrogen fluoride was shaken in a tightly-capped iron bomb for 16 hours at about 25° C. The reaction mixture was worked up as in the preceding Examples I and II. A light-colored resin, 290 grams, with a ball-and-ring melting point of about 143° C. was thus obtained.

The examples and procedures given hereinabove are intended to be illustrative only, and the invention is not to be construed as limited thereto. It will be apparent to those skilled in the art that numerous modifications and variations of the illustrative examples and procedures may be included within the scope of the appended claims.

We claim:

1. A process for making light-colored resinous materials from petroleum products, which comprises reacting an aromatic rich hydrocarbon fraction obtained from a catalytic cracking operation of a petroleum stock and having a boiling range of about 310° F. to 395° F. at atmospheric pressure with tri-oxymethylene in the proportion of about 250 parts of said hydrocarbon fraction to about 50 parts of tri-oxymethylene in the presence of about 35 parts of anhydrous hydrogen fluoride at about 100° C. for about 18 hours in a closed container, cooling the contents of said container, neutralizing the cooled contents of said container with sodium hydroxide, taking up the neutralized contents of said container in benzol, washing said benzol solution with water, separating benzol-insoluble material from said benzol solution, distilling said separated benzol solution to a pot temperature of 250° C. under 10 millimeters of pressure to obtain a light colored resinous residue having a ball-and-ring melting point of about 89° C.

2. A process for making light colored resinous materials from petroleum products which comprises reacting an aromatic rich hydrocarbon fraction obtained from a thermally treated recycled stock from a thermal cracking operation and having a boiling range of about 400° F. to about 600° F. at atmospheric pressure with tri-oxymethylene in the proportion of about 200 parts of said hydrocarbon fraction to about 40 parts of trioxymethylene in the presence of about 25 parts of anhydrous hydrogen fluoride for six hours at about 0° C. in a closed container, agitating the contents of said container for about sixteen hours at room temperature, neutralizing the contents of said container with sodium hydroxide, taking up the neutralized contents of said container in benzol, washing said benzol solution with water, separating benzol-insoluble material from said benzol solution, and distilling said separated benzol solution to a pot temperature of about 250° C. under 10 millimeters of pressure to obtain a light colored resinous material having a ball-and-ring melting point of about 77° C.

3. A process for making light colored resinous materials from petroleum products which comprises reacting an aromatic rich hydrocarbon fraction obtained from a catalytic cracking operation and having a boiling range of about 500° F. to about 735° F. and a Saybolt Universal Viscosity at 100° F. of about 50 seconds with tri-oxymethylene in the proportion of about 1000 parts of said hydrocarbon fraction to about 200 parts of the trioxymethylene in the presence of about 105 parts of hydrogen fluoride for about 16 hours at about 25° C. in a closed container, neutralizing the contents of said container with sodium hydroxide, taking up the neutralized contents of said container in benzol, washing said benzol solution with water, separating benzol-insoluble material from said benzol solution, and distilling said separated benzol solution to a pot temperature of 250° C. under 10 millimeters of pressure to obtain a light colored resinous residue having a ball-and-ring melting point of about 143° C.

4. In a process for the production of a resinous product by the condensation, in the presence of an acid condensing agent, of formaldehyde and a petroleum fraction rich in aromatic hydrocarbons, the improvement affording a substantially high melting point product of light color which comprises condensing said formaldehyde and an aromatic-petroleum fraction selected from the group consisting of those obtained by catalytic cracking of petroleum stocks and having boiling ranges of from about 300° F. to about 400° F. and from about 500° F. to about 750° F.; those obtained by cyclization of petroleum stocks and having boiling ranges of from about 300° F. to about 400° F. and from about 500° F. to about 750° F.; those obtained by catalytic cracking and cyclization of petroleum stocks and having boiling ranges of from about 300° F. to about 400° F. and from about 500° F. to about 750° F.; and those obtained by thermal cracking of petroleum stocks and having boiling ranges of from about 400° F. to about 600° F., in the presence of hydrogen fluoride.

5. In a process for the production of a resinous product by the condensation, in the presence of an acid condensing agent, of formaldehyde and a petroleum fraction rich in aromatic hydrocarbons, the improvement affording a substantially high melting point product of light color which comprises condensing said formaldehyde and an aromatic-petroleum fraction selected from the group consisting of those obtained by catalytic cracking of petroleum stocks and having boiling ranges of from about 300° F. to about 400° F. and from about 500° F. to about 750° F.; those obtained by cyclization of petroleum stocks and having boiling ranges of from about 300° F. to about 400° F. and from about 500° F. to about 750° F.; those obtained by catalytic cracking and cyclization of petroleum stocks and having boiling ranges of from about 300° F. to about 400° F. and from about 500° F. to about 750° F.; and those obtained by thermal cracking of petroleum stocks and having boiling ranges of from about 400° F. to about 600° F., in the presence of from about 0.5% to about 50% by weight of hydrogen fluoride.

6. In a process for the production of a resinous product by the condensation, in the presence of an acid condensing agent, of formaldehyde and a petroleum fraction rich in aromatic hydrocarbons, the improvement affording a substantially high melting point product of light color which comprises condensing said formaldehyde and an aromatic-petroleum fraction selected from the group consisting of those obtained by catalytic cracking of petroleum stocks and having boiling ranges of from about 300° F. to about 400° F. and from about 500° F. to about 750° F.; those obtained by cyclization of petroleum stocks and having boiling ranges of from about 300° F. to about 400° F. and from about 500° F. to about 750° F.; those obtained by catalytic cracking and cyclization of petroleum stocks and having boiling ranges of from about 300° F. to about 400° F. and from about 500° F. to about 750° F.; and those obtained by thermal cracking of petroleum stocks and having boiling ranges of from about 400° F. to about 600° F., in the presence of from about 5% to about 20% by weight of hydrogen fluoride.

7. In a process for the production of a resinous product by the condensation, in the presence of an acid condensing agent, of formaldehyde and a petroleum fraction rich in aromatic hydrocarbons, the improvement affording a substantially high melting point product of light color which comprises condensing trioxymethylene and an aromatic-petroleum fraction selected from the group consisting of those obtained by catalytic cracking of petroleum stocks and having boiling ranges of from about 300° F. to about 400° F. and from about 500° F. to about 750° F.; those obtained by cyclization of petroleum stocks and having boiling ranges of from about 300° F. to about 400° F. and from about 500° F. to about 750° F.; those obtained by catalytic cracking and cyclization of petroleum stocks and having boiling ranges of from about 300° F. to about 400° F. and from about 500° F. to about 750° F.; and those obtained by thermal cracking of petroleum stocks and having boiling ranges of from about 400° F. to about 600° F., in the presence of hydrogen fluoride.

8. A process for making light-colored resinous materials from petroleum products which comprises reacting trioxymethylene with an aromatic-petroleum fraction selected from the group consisting of those obtained by catalytic cracking of petroleum stocks and having boiling ranges of from about 300° F. to about 400° F. and from about 500° F. to about 750° F.; those obtained by cyclization of petroleum stocks and having boiling ranges of from about 300° F. to about 400° F. and from about 500° F. to about 750° F.; those obtained by catalytic cracking and cyclization of petroleum stocks and having boiling ranges of from about 300° F. to about 400° F. and from about 500° F. to about 750° F.; and those obtained by thermal cracking of petroleum stocks and having boiling ranges of from about 400° F. to about 600° F., in the presence of from about 5% to about 20% by weight of hydrogen fluoride, neutralizing the resulting product with sodium hydroxide, taking up the neutralized product in benzol, washing said benzol solution with water, separating benzol-insoluble matter from said benzol solution, distilling said separated benzol solution to remove benzol therefrom and obtain a light-colored, substantially high melting point resinous residue.

DARWIN E. BADERTSCHER.
RICHARD B. BISHOP.